July 5, 1966 P. HERNADI 3,259,164
GANG NUT STRIP
Filed June 5, 1964 2 Sheets-Sheet 2
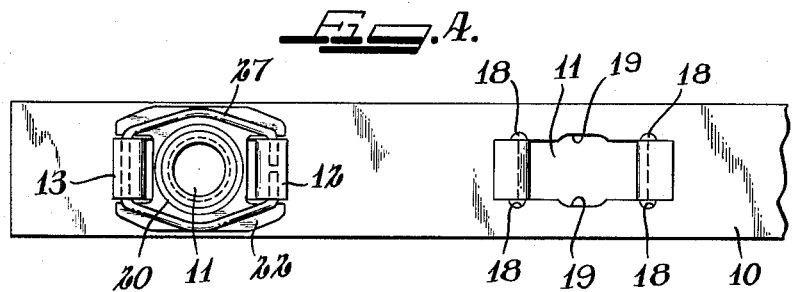
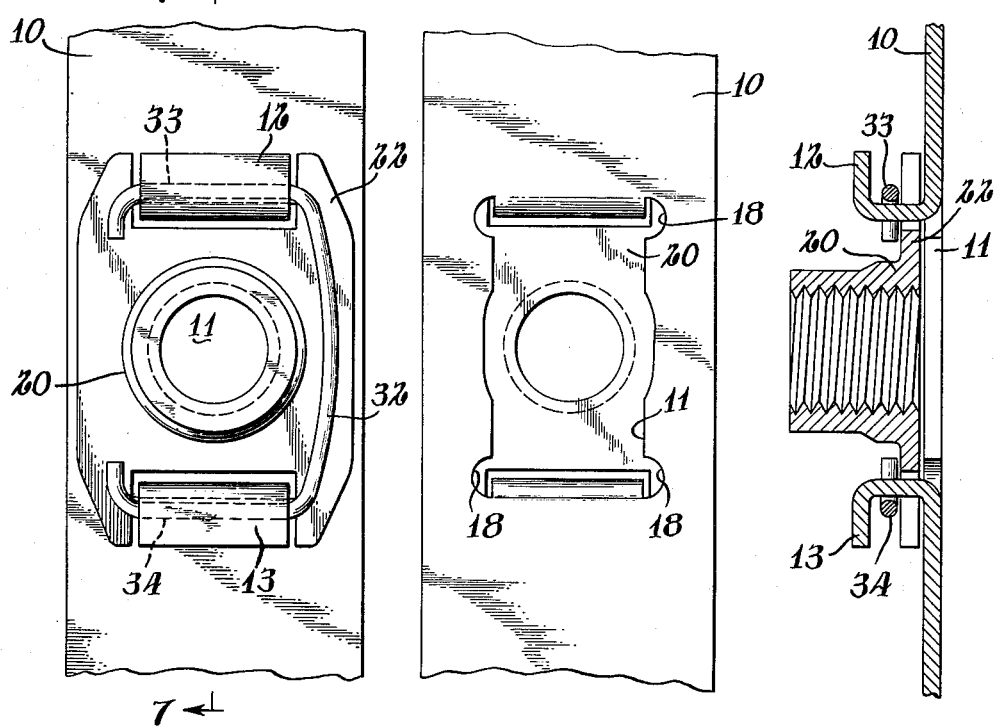
INVENTOR.
PAUL HERNADI
BY
Greist, Lockwood, Greenawalt & Dewey
Attys.

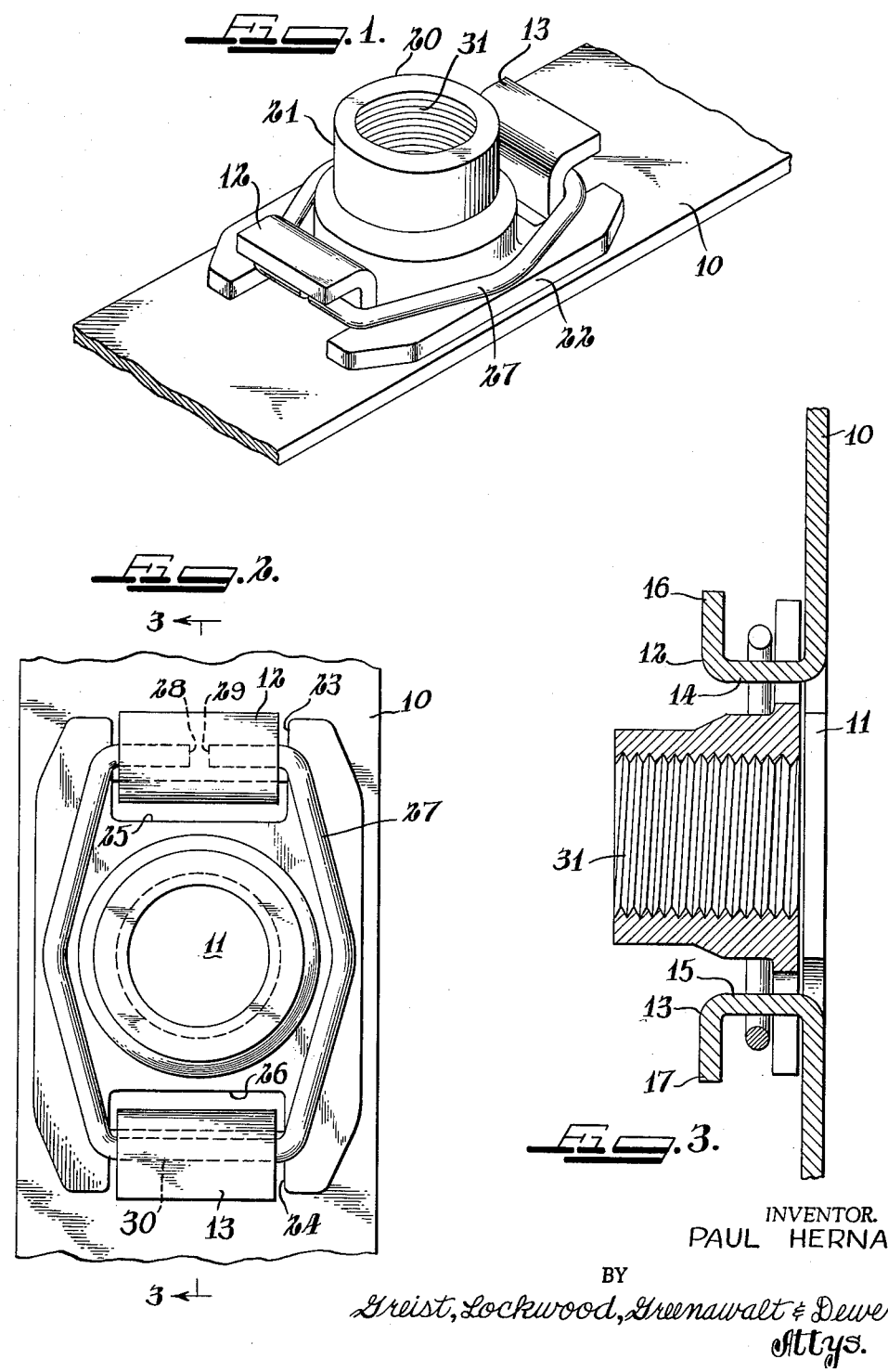
July 5, 1966 — P. HERNADI — 3,259,164
GANG NUT STRIP
Filed June 5, 1964 — 2 Sheets-Sheet 1
INVENTOR.
PAUL HERNADI
BY
Greist, Lockwood, Greenawalt & Dewey
Attys.

United States Patent Office 3,259,164
Patented July 5, 1966

3,259,164
GANG NUT STRIP
Paul Hernadi, Torrance, Calif., assignor to VSI Corporation, Pasadena, Calif., a corporation of Illinois
Filed June 5, 1964, Ser. No. 372,892
6 Claims. (Cl. 151—41.76)

This invention relates to a fastening system in general, and more particularly is directed towards a gang nut strip particularly adapted to be used in joining structural parts or members together.

In aircraft, aerospace, and related applications, structural members and/or parts are releasably joined in order to enhance the ease of assembly, inspection, replacement and/or repair of members or parts to be joined. Ordinarily, this is accomplished by providing a bolt and nut assembly and in more sophisticated fastening systems by providing suitable means to mount either the nut or the bolt in a non-rotatable manner. In the former case, the nut is mounted in alignment with suitable apertures formed in one of the members or parts to be joined and held against rotation.

The present invention is directed to a new and improved gang nut strip particularly adapted for use in the more sophisticated fastening application mentioned above. The gang nut strip of the present invention is provided with suitable means for mounting a plurality of fasteners such as flanged nuts in a non-rotatable and floating manner, being unique in that the material normally removed from the mounting strip to permit passage of the fastener through the strip is rolled back to form a part of the retainer means to maintain the threaded member floatingly aligned with the aperture in the strip. The gang nut strip may then be carried on one of the members or parts to be joined as will be described hereinafter. For convenience of description, the device will be described in conjunction with a gang nut strip, however as will be pointed out hereinafter is equally applicable to other forms of fasteners such as bolts and the like.

The specific details and broad advantages of the present invention will be better comprehended upon a consideration of the objects to be achieved and the more salient features of the invention described in detail below.

It is an object of this invention to provide a new and improved gang-type strip of simplified construction adapted to floatingly mount a fastener in a simplified manner.

It is a further object of this invention to provide a new and improved gang-type strip wherein the retention means to hold the fastener to the strip is formed from the portion of the strip removed to provide an aperture for the passage of a threaded fastener.

It is a further object of this invention to provide a new and improved gang nut strip of simplified form wherein the fasteners are easily replaced, floatingly held, and the strip and fastener assembly is of minimum weight.

It is a further object of this invention to provide a new and improved gang-type strip assembly of simplified design which contributes to the reduction in total cost of manufacture when contrasted with the more complicated and complex prior art devices adapted to perform a like function.

Further and fuller objects will become readily apparent when reference is made to the accompanying drawings wherein:

FIG. 1 is a fragmentary perspective view of a gang nut strip embodying the principles of the present invention being taken in the vicinity of one of the flange nut members;

FIG. 2 is a top plan view of the gang nut strip of FIG. 1;

FIG. 3 is a cross sectional view taken along the lines 3—3 of FIG. 2;

FIG. 4 is a fragmentary top plan view on a reduced scale similar to the gang nut strip of FIG. 2 illustrating one flange nut member in place and the shape of the next adjacent aperture prior to assembly of a flanged nut thereto;

FIG. 5 is an enlarged fragmentary top plan view of a gang nut strip similar to that shown in FIG. 4 illustrating a modified form of retainer;

FIG. 6 is a plan view of the underside of the gang nut strip of FIGS. 1 and 5; and FIG. 7 is a cross sectional view of the gang nut strip of FIG. 6 taken along the lines 7—7 of FIG. 6.

Referring now to FIGS. 1–4, a gang nut strip is represented generally by the reference character 10 being a longitudinally continuous mounting strip of desired length and width pierced at regular intervals to form apertures or openings 11. A pair of integral tab members 12 and 13 are formed from the material removed in punching out the aperture or opening 11. The tabs 12 and 13 are of uniform design having upstanding leg portions 14 and 15 respectively which project upwardly from the face of the strip 10 and then curl outwardly as at 16 and 17 to form a pair of oppositely directed flanges substantially parallel to the face of the strip 10.

As is seen in FIG. 4, the strip 10 may be of any desired length and the spacing between openings 11 may be any suitable distance depending upon the fastening application. As illustrated in the right-hand portion of FIG. 4, and the plan view of FIG. 6, suitable relief grooves 18 are formed at the junction between the strip 10 and legs 14 and 15 on the tabs 12 and 13 to enhance the ease of forming the tabs and reduce stresses at the bend. The central section of the opening 11 may be made arcuate as at 19 along the marginal edges for reasons to become apparent.

Referring once again to FIGS. 1–4, a flanged nut member is indicated generally at 20 having a tubular barrel portion 21 integral with a generally flat base portion 22. A pair of slots 23 and 24 open on one side are provided at opposite ends of the base to make it generally H shaped. The slots 23 and 24 are of sufficient lateral width to allow a loose fit with the upwardly projecting leg portions 14 and 15 of the tabs 12 and 13, and when inter-engaged therewith, allow slight lateral movement of the flange nut member 20 for reasons to become apparent.

The spacing between the bottom portion or inner margin 25 and 26 of the slots 23 and 24 respectively is lesser than the inside dimension between the legs 14 and 15 of the tabs 12 and 13 to allow the flanged nut member 20 to also float longitudinally of the strip 10. In one specific embodiment, the floatability of the flanged nut was of the order of 0.020 inch in a lateral direction from one side to the other with the longitudinal floatability of the order of 0.030 inch in each direction from the central position illustrated in the drawings. Obviously, these limits may be varied to suit any particular application.

The flanged nut member 20 is restrained or limited in the total movement away from the face of the strip 10 by means of a split spring clip retainer 27 which is positioned around the tubular barrel 21 and the legs 14 and 15 of the tab members 12 and 13, the latter being engageable with the underside of the flanges 16 and 17. This permits the flanged nut member 20 to float a slight amount in a direction away from the face of the strip and enhances the ease with which the split spring clip 27 may be assembled to join the flanged nut 20 to the strip 10.

The spring clip member 27 has sufficient resilience to permit the ends 28 and 29 at the split to be spread for placement over the tab 12 after the base 30 of the clip 27 is hooked under the flange 17 of the tab 13. Once the spring clip 27 is in place, it serves to retain a flanged nut member 20 on the strip 10 while permitting removal and replacement of the flanged nut 20 at any time should the threaded portion 31 in the tubular barrel 21 become stripped, worn or damaged. Obviously, flanged nuts have different thread sizes and pitches may be readily substituted if desired.

It is further obvious that the strip 10 and flanged nut 20 may be made of any suitable size depending upon the requirements and environment of intended use. In addition, the gang nut strip 10 while being illustrated as a straight elongated strip of rectangular cross section, may be formed in any suitable shape to conform with the configuration of the elements or parts to be joined.

Referring now to FIGS. 4 and 6, the manufacture of the gang nut strip of the present invention will now be explained. A strip of metal stock of suitable dimensions is provided with apertures 11 formed at desired intervals. In forming the apertures 11, the material removed is divided at the center of the aperture 11 and each portion is bent or rolled to form the tabs 12 and 13. As pointed out previously, any desired spacing between the openings is possible. Also, the strip 10 may be formed from stock of any desired shape or material. After the tabs 12 and 13 are formed, the flanged nut 20 having the generally H-shaped base 22 is positioned on the strip 10 so that the slots 23 and 24 are loosely inter-engaged with the tabs 12 and 13.

The spring clip retainer 27 is then used to join the flanged nut 20 to the strip 10 by hooking the base 30 of the spring clip retainer 27 under the flange of one of the tabs and expanding the split ends 28 and 29 to permit passage over the opposite tab, at which time the split ends are released permitting them to come together under the flange. Removal is accomplished in reverse order.

The strip 10 may be fastened to any of the members to be joined with the aperture 11 in alignment with the apertures provided in the structural member or part joined if desired, or alternatively the strip 10 may be retained in place by fasteners co-operating with each of the flanged nuts 20. The strip can consist of one or more flanged nut members 20 mounted on the strip 10 depending on the requirements of the particular application.

Referring now to FIGS. 5–7, the strip 10 illustrated is identical to the one illustrated in the plan view of FIG. 2, and like references are used to denote like parts. In FIGS. 5–7, however, the split spring clip retainer 27 has been replaced by a C-shaped spring retainer 32 which co-operates with the underside of the flanges 16 and 17 on the tabs 12 and 13 in the same manner described in conjunction with the split spring clip retainer 27 of FIGS. 1–4 to hold the flanged nut 20 to the strip 10. As was possible in the embodiment of FIGS. 1–4, the flanged nut member 20 may be removed and replaced and in the present embodiment is accomplished by merely expanding the legs 33 and 34 on the C-shaped spring member 32 and withdrawing the same from engagement with the tabs 12 and 13. Assembly is accomplished in reverse order.

As noted briefly above the principles of the present invention are also applicable to other forms of fasteners such as bolts and the like. It is readily apparent that a bolt head can be formed in an H-shaped configuration and retained on the strip in the manner described above. Obviously, the shank of the bolt may project through the opening 11 in the strip 10 or upwardly in the manner of the tubular barrel portion 21 of the nut 20.

In each of the embodiments described above, the unique manner of mounting the fastener provides high resistance to torsion, which is experienced during fastening and unfastening operations. In addition, wide latitudes in the choice of materials used in possible since the total weight is kept at minimum.

From the foregoing description it is obvious that the present invention provides distinct advantages in the form of economy in manufacture, ease of replaceability, and simplicity in assembly of gang-type strips for use in mounting fasteners. The unique manner of maintaining the fasteners permits the total weight of the gang nut strip to be kept at an absolute minimum without reducing the torsional holding power, which in aerospace and aircraft applications is extremely advantageous.

It will become immediately obvious to those skilled in the art that other modifications may be made without departing from the spirit and scope of the invention, and therefore, any limitations imposed should be within the spirit and scope of the appended claims.

I claim:

1. A gang nut strip particularly adapted for use in joining structural members and the like together comprising an elongated strip, an aperture in said strip formed by punching two tab members out of said strip, each of said tabs projecting generally upwardly from the face of said strip and being curled at their outer ends into an axially projecting flange extending away from said aperture, a flanged nut having a tubular barrel portion integral with a flat base portion, said flat base portion having slots at opposite ends thereof to form a generally H shape, said slots being loosely interfitted with said tabs to permit slight movement laterally and longitudinally of said strip while maintaining said barrel portion of said nut within the limits defined by said aperture in said strip, said slots forming said H-shaped base having side portions thereof engageable with side portions of said tab members when torque is applied to said flanged nut, and spring retainer means having at least a part thereof positioned beneath said each of flange on said tabs and overlying at least a portion of said base to prevent withdrawal of said nut in a direction generally perpendicular to said face on said strip.

2. The gang nut strip of claim 1 wherein said spring retainer means to prevent withdrawal of said nut from said strip comprises a split spring-like clip extending around the upwardly projecting portion of both of said tabs, and engageable with said curled flange portion on said tab to limit the movement of the base of said flanged nut away from the face of said strip.

3. The gang nut strip of claim 1 wherein said retainer means preventing withdrawal of said nut comprises a C-shaped spring clip hooked around the upwardly projecting portion of said lugs.

4. A gang nut strip for use in joining parts, structural members and the like comprising a metallic strip, at least one aperture in said strip, a pair of tabs formed from the material removed from said aperture, each of said tabs being bent so as to have a leg portion thereof projecting upwardly from said strip, a flange portion formed at the outer end of each of said leg portions and projecting away from said aperture, a flanged nut having a tubular threaded barrel portion and a flat base portion, slot means in said base portion loosely interfitted with each of said leg portions and permitting said threaded barrel portion to float a limited amount laterally and longitudinally of said aperture in said strip to accommodate misalignment in the parts to be joined, each of said slot means being of generally U-shape to permit said base to be interfitted with the respective one of said flanged and leg portions by installation and replacement along an axis perpendicular to said strip, and spring retainer means having at least a part thereof cooperating with an underside portion of said flanges on each of said tabs and an upper surface of said flat base portion to limit the movement of said flanged nut perpendicularly of said strip.

5. The gang nut strip of claim 4 wherein said spring retainer means cooperating with said flanges on each of said tabs to limit the movement of said flanged nut away from said strip comprises a split spring clip member having said part thereof hooked around said legs on said tabs between said flanges on said strip.

6. A gang-type fastener strip particularly adapted for use in joining structural members and the like together comprising an elongated strip, an aperture in said strip formed by punching two tab members out of said strip, each of said tabs projecting generally upward from the face of said strip and being curled at their outer ends into a flange projecting away from said aperture, a fastener having a flat base portion with U-shaped slots at opposite ends thereof, said U-shaped slots being loosely inter-engaged with said tabs to permit limited movement laterally and longitudinally of said strip while maintaining said fastener generally within the limits defined by said aperture in said strip, each of said slots having sidewall portions engageable with opposite sides of said upward projecting portion of said tabs, and spring retainer means to prevent withdrawal of said fastener in a direction generally perpendicular to said face on said strip thereby retaining said slots floatingly engaged with said tabs to hold said fastener against rotation, said spring retainer means having at least a part thereof positioned beneath said flange on each of said tabs and overlying said flat base portion of said fastener.

References Cited by the Examiner
UNITED STATES PATENTS

| | | | |
|---|---|---|---|
| 1,757,143 | 5/1930 | Renner | 151—41.74 |
| 2,144,553 | 1/1939 | Simmonds | 151—41.76 |
| 2,243,923 | 6/1941 | Swanstrom | 151—41.76 |
| 2,304,107 | 12/1942 | Leisure | 151—41.76 |
| 2,381,233 | 8/1945 | Summers | 151—41.71 |
| 2,469,312 | 5/1949 | Poupitch | 151—41.76 |
| 3,219,086 | 11/1965 | Zahodiakin | 151—41.76 |

CARL W. TOMLIN, *Primary Examiner.*

M. PARSONS, JR., *Assistant Examiner.*